United States Patent Office 3,226,936
Patented Jan. 4, 1966

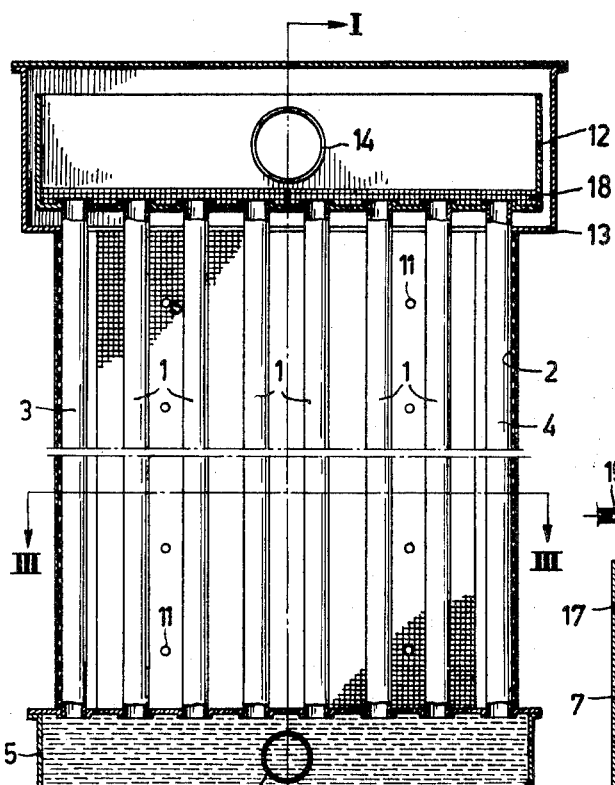
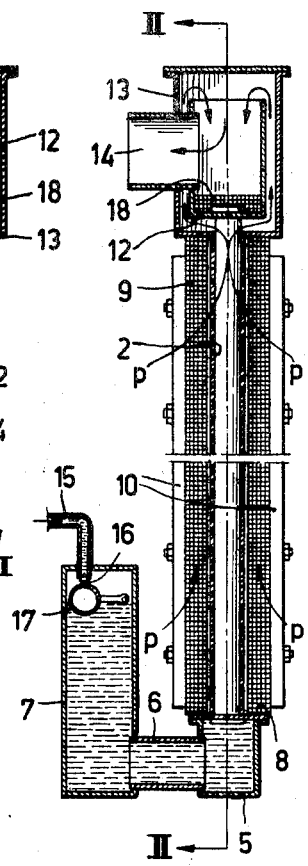
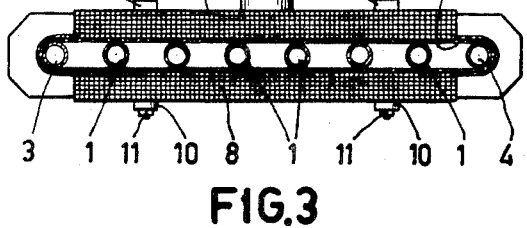
FIG. 2
FIG. 1
FIG. 3
INVENTOR
JOHANNES R. VAN GEUNS

3,226,936
METHOD OF MAINTAINING THE CONTINUOUS OPERATION OF A DEVICE FOR SEPARATING CONSTITUENTS IN THE SOLID STATE FROM A GAS MIXTURE BY COOLING AND DEVICES FOR CARRYING OUT THESE METHODS
Johannes Rudolphus Van Geuns, Emmasingel, Eindhoven, Netherlands, assignor to North American Philips Company, Inc., New York, N.Y., a corporation of Delaware
Filed Aug. 28, 1962, Ser. No. 219,840
Claims priority, application Netherlands, Sept. 20, 1961
269,433
4 Claims. (Cl. 62—13)

The invention relates to a method of maintaining the continuous operation of a device for separating constituents in the solid state from a gas mixture by cooling, which device comprises one or more layers of a gas-pervious permeable material, these layers being cooled by their thermal contact with supports, which comprise cooling channels containing a liquified gas. The invention furthermore relates to a device for carrying out this method.

Gas mixtures split up into their constituents for example in gas fractionating systems, or condensed on the very cold head of a cold-gas refrigerator are often desired to be purified from certain constituents such as water vapour, carbon dioxide, and hydrocarbons prior to fractionation or condensation. When cooled, said constituents solidify at temperatures considerably higher than those of fractionation or condensation and are separated out in the form of ice or snow. This may have a troublesome effect, since ducts, for example in heat-exchangers may become clogged or the condensate may become contaminated.

For purifying such gas mixtures various devices are known; they comprise a cooled layer of a gas-pervious material, usually a layer of metal gauze, cooled by the thermal contact with supports, for example ducts containing a liquified gas, the temperature of which is lower than the temperature at which the constituents from which the gas mixture is to be purified solidify. These constituents grow on the layers of metal gauze in the form of ice or snow; this layer of snow must maintain a porosity such that, even with a fairly large thickness the resistance to flow in this layer remains below a reasonable value.

The known devices of the kind set forth always have the disadvantage that the cooled, gas-pervious materials are cooled to a low temperature, which results in that not only the constituents to be separated out in the solid state are obtained, but also part of the purified gas condenses on the material of these layers or on the snow already built up. The result is a reduced efficiency of the device and, moreover, a very rapid obstruction of the layer of snow owing to the condensed purified gas mixture, so that the device ceases operation.

In order to overcome this disadvantage the method according to the invention for maintaining a continuous operation of a device for separating out constituents in a solid state from a gas mixture by cooling is characterized in that the supports and the layers being in thermal contact herewith are kept at an least substantially constant temperature, which is lower than the temperature of solidification of the constituents to be separated out and which is higher than the condensation temperature of the purified gas mixture.

An advantageous form of a method embodying the invention is furthermore characterized in that a boiling gas mixture is caused to circulate through the ducts provided in the supports by a pumping action, while the quantity of liquified gas mixture is fed to the device does not exceed the quantity evaporated owing to the supply of heat, provisions being made for the vapour and the fluid to be in a state of equilibrium and that the vapour contains at the most the same quantity of the constituent boiling at the lowest temperature as the purified gas mixture. By the last-mentioned provision it is ensured that the temperature of the vapour-fluid mixture in the ducts is just sufficiently high for the initiation of the condensation of purified gas mixture to be avoided.

A further advantageous method embodying the invention is characterized in that the liquified gas is transported through the ducts by a vapour-lift pump effect produced in these ducts, the liquid pumped up being refed to the lower side of the device. It will be evident that with this embodiment of the method the ducts of the device must be arranged at an angle to the horizontal plane. The heat withdrawn from the gas mixture to be purified produces in this case the desired vapour-lift pumping effect.

In accordance with the invention this method can be effectively carried out by employing a device comprising one or more layers of a gas-pervious material, which layers are in thermal contact with supports provided with cooling ducts, this device being furthermore characterized in that it comprises a feeder of liquified gas mixture to the ducts of the supports so that the liquified gas mixture in the duct boils while there is provided a control-member which supplies such a quantity of liquified gas mixture as is evaporated in the ducts. The supply of liquified gas to the ducts may be carried out, for example, by means of a pump, which has to be adjusted so that the supplied liquified gas in the ducts boils. Owing to this boiling effect, part of the liquified gas mixture will leave the device in the form of vapour and the control-member will ensure that the quantity of liquid in the device does not vary. Since the liquid in the duct boils, it is ensured that the temperature of the liquid-vapour mixture in the ducts has a value such that condensation of the purified gas mixture does not occur on the gas-pervious layers.

A further advantageous embodiment of the device according to the invention, in which the cooling ducts of the supports are at an angle to the horizontal plane, is characterized in that the supports are formed by a number of tubes lying in one plane and having their two ends communicating with a lower and an upper common space. A layer of a gas-pervious material is fastened to said tubes on one side or on both sides of the plane going through these tubes and wherein at least one of the tubes is not connected with the layer and the lower common space is provided with a supply duct for a liquid gas mixture. Furthermore, the upper common space is provided a gas outlet opening, while the supply duct for the liquified gas mixture communicates with a container of liquified gas mixture, the level of which is kept constant.

In this embodiment of the device according to the invention no separate pump is required for conveying the liquid gas mixture through the tubes. The pumping effect is obtained in that the heat withdrawn from the gas mixture to be purified is transmitted via the gas-pervious layers and the ducts in thermal contact therewith to the liquified gas mixture contained in said ducts. Thus a kind of vapour-lift pumping effect is obtained in the ducts, so that the liquified gas is caused to circulate through the ducts. The pumped-up liquid is fed back through at least one tube, which is not in thermal contact with the said layers and therefore obtains less heat, and hence does not exhibit a vapour-lift pumping effect to the lower space of the device.

The evaporated quantity of gas mixture in the device is replenished via the communication of the lower common space with a container of liquified gas, the level of which is kept constant. The liquid level may be kept constant, for example by means of a float, co-operating with a closing member in a supply duct for liquified gas to this container. As an alternative, a flow of liquified gas may be continuously fed to the container, which is then provided with an overflow, so that the liquid level therein is determined by the disposition of this overflow.

Although the liquid pumped up in the ducts can be fed back through a duct not being in thermal contact with the gas-pervious layers to the lower common space, the pumped-up liquid may be fed from the upper common space to said container, if the aforesaid float control is employed for keeping the liquid level in the container constant. It will be evident that this pumped-up quantity of liquid will be fed back via the container to the device.

The vapour produced in the ducts can leave the upper common space via the gas outlet opening. Since this vapour and the purified gas mixture often have substantially the same composition, an advantageous device embodying the invention is characterized in that the upper common space is in open communication with the gas supply duct so that gas can flow partly into the gas supply duct, but no liquid can enter therein. It is thus avoided, in a simple manner, that a considerable quantity of cold gets lost together with the vapour formed in the ducts.

The invention will now be described more fully with reference to the drawing, which is not to scale and which is to be considered by way of example.

FIGS. 1, 2 and 3 show a device for separating out constituents in a solid state from a gas mixture in three orthogonal sections.

Figure 4:
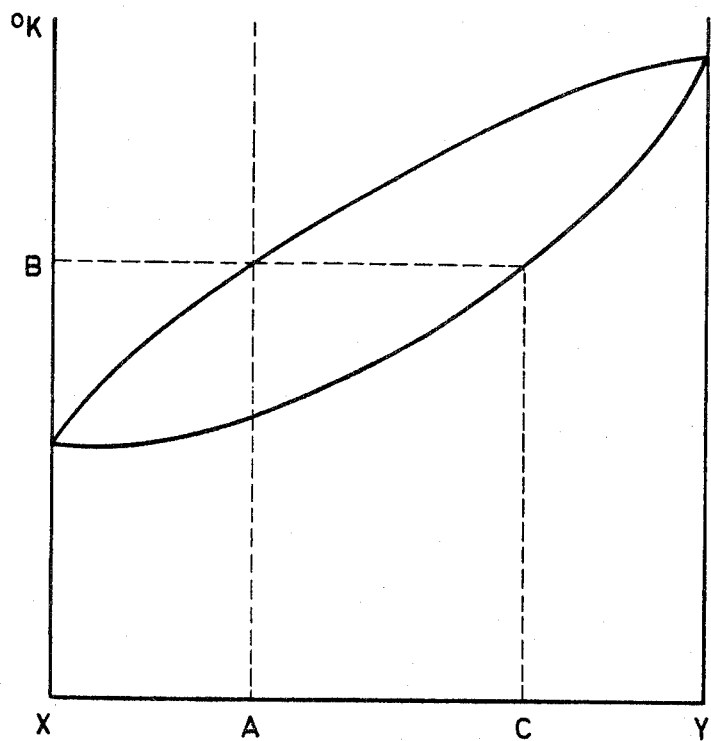
FIG. 4 shows the phase diagram of a two-constituent gas mixture.

Referring to FIGS. 1, 2 and 3 reference numeral 1 designates a number of ducts arranged in a flat plane. A layer of metal gauze 2 is soldered to these ducts. The outer ducts 3 and 4, which are co-planar to the ducts 1, are not connected with the gauze layer 2.

The ducts 1, 3 and 4 open out on the lower side in the liquid container 5, which communicates via a duct 6 with a container 7 for the coolant.

The gauze layer 2 is provided, on either side of the plane going through the ducts 1, 3 and 4, with a zigzag layer of a metal gauze 8, 9 respectively. The metal gauze layers 8 and 9 are held in place by strips 10, which are urged against the gauze layers 8 and 9 by bolts and nuts 11.

On their lower side the ducts 1, 3 and 4 open out in a container-shaped structural part, which is open on the upper side. Above the openings of the ducts 1, 3 and 4 in the structural part 12 a number of gauze layers 18 are arranged. The container part 12 is surrounded by a further container 13, which surrounds the former with a given space and which is in open communication on the lower side with the space between the ducts 1, 3 and 4 and the gauze layer 2. The container part 12 communicates with a gas supply duct 14, which may feed the purified gas mixture and the vapour produced in the ducts to a cold-gas refrigerator (not shown) or to a gas fractionating system.

The device comprises furthermore a supply duct 15 for supplying a liquified gas mixture to the container 7. This duct 15 may be closed or opened by a valve 16. The position of the valve 16 is regulated by a float 17 in the liquid in the container 7 so that with a dropping liquid level the valve 16 is opened and with a rising level it is closed.

The device operates as follows. Since the container 7 communicates with the device and contains liquified gas mixture, the level of the liquid in the container 7 and in the ducts 1, 3 and 4 is the same. This comparatively cold liquified gas mixture cools the ducts 1, 3 and 4 and the gauze layers 8 and 9, being in thermal contact herewith. By drawing out via the gas suction duct 14 a gas mixture to be purified, which is fairly warm with respect to the liquified gas in the ducts 1, 3 and 4, heat is withdrawn from this supplied gas mixture, which passes through the gauze layers 8 and 9 in the direction of the arrow $p$. This heat is transmitted via the gauze layers 8, 9 and 2 to the ducts 1. Owing to this supply of heat the liquified gas mixture in these ducts starts boiling, so that a vapour-lift effect is produced and the liquid is pumped up in these ducts. The ducts are thus filled completely with liquified gas mixture and vapour and are uniformly cooled throughout their length. If the temperature of the drawn-in gas mixture to be purified is too high, so that their is an excessive supply of heat to the ducts, the liquified gas in the ducts is likely to boil violently and to be sprayed in the container part 12. Thus part of the pumped-up liquid may be drawn away with the vapour. In order to avoid this spraying effect a number of gauze layers 18 are arranged above the openings of the ducts in the container part 12.

The pumped-up liquified gas mixture can flow back via the ducts 3 and 4 towards the liquid container 5, since the ducts 3 and 4 are not connected with the gauze layer 2, so that the resistance to the heat transmission between these gauze layers and the ducts is much greater than between the ducts 1 and these gauze layers. Thus a vapour-lift effect is avoided in the ducts 3 and 4, so that the liquid can flow back through these ducts towards the container 5.

The boiling liquified gas mixture in the ducts cools the ducts and the gauze layers 2, 8 and 9. The suctioned gas mixture to be purified is cooled when passing through the gauze layers, only the constituents to be separated out being deposited in a solid state in the form of a growing layer of ice or snow on the gauze layers. This can be achieved, however, only by cooling the ducts and the attached gauze layers to such a great extent that the vapor pressures of the contaminants in the sectioned gas mixture thereby cooled are sufficiently low, so that the deposit of the constituents on the gauze layers is obtained. This determines the maximum temperature of the boiling liquified gas mixture in the ducts. The lower temperature limit of the liquified gas is determined by the initial condensation temperature of the purified gas mixture. If the temperature of the gauze layers drops below this initial condensation temperature of the purified gas mixture, part of the purified gas mixture will condense in the ice or snow layer formed, the resistance to flow of which will be thus rapidly increased, which is highly detrimental to the efficiency of the device.

If, for example, the purified gas mixture has two constituents $x$ and $y$ in a composition indicated in FIG. 4 by point A, the initial condensing temperature, as will also be seen from FIG. 4, is B°K.

In accordance with the invention it can be avoided in a simple manner that the temperature of the gauze layers 8 and 9 drops below the said temperature. To this end a liquified gas is fed to the device, which is also composed of the constituents $x$ and $y$, this mixture also having the composition A. Owing to the supply of heat to the ducts 1, the liquified gas starts boiling therein, the vapour and the liquid in these ducts being in a state of equilibrium. The liquid circulating through the ducts 1 has a composition C and is in a state of equilibrium with the vapour of the composition A. The temperature of the liquified gas which then corresponds with the initial condensation temperature of the purified gas mixture is just sufficiently high for an initiation of condensation of the purified gas mixture to be prevented. Owing to the supply of liquified gas having a composition corresponding to a point on the right-hand side of point A on the liquid line $x$–$y$ of FIG. 4, the liquid in the ducts may have a composition corresponding to a point on the righthand side of point C on the line $x$–$y$. The temperature of the liquid-vapour mixture in the ducts 1 is then higher than B°K., so that no condensation of the purified gas mixture can occur.

The quantity of liquified gas mixture evaporating in the ducts 1 is immediately replenished from the container 7, so that the device invariably contains the same quantity of liquid.

Although reference is made herein to a gas mixture having two constituents, it will be evident that gas mixtures having more constituents may be purified in this device from undesirable constituents.

In the device shown in the drawing the level control in the container 7 is performed by a float 17, which cooperates with a valve 16. Instead of this level control, other structures may be employed, for example an electrical level control or an overflow.

What is claimed is:

1. A method for maintaining in continuous operation a separator for ice in a solid state from a cooled gas mixture comprising providing at least one layer of gas-pervious material through which said gas mixture traverses, said gas-pervious material being in heat exchanging contact with a first group of cooling ducts, other cooling ducts being unconnected to said gas-pervious material, delivering cooling liquid to said first group of cooling ducts, passing a gas mixture over said gas-pervious material whereby heat is imparted to said first group of cooling ducts causing a vapor lift effect to the cooling liquid in said first group of cooling ducts, the temperature of said gas-pervious material being lower than the temperature at which said constituents to be separated out become solid, and supplying only a quantity of gas mixture through said layer of gas-pervious material substantially equal to the quantity evaporated due to the supply of heat to the apparatus whereby said ice is separated out on said gas-pervious material and the cooling liquid forced out of said first group of ducts flows back to the beginning of the cooling liquid circuit through the other of said cooling ducts.

2. A continuously operated separator for separating out constituents in a solid state from a cooled gas mixture comprising a first group of cooling ducts having cooling liquid therein, at least one layer of gas-pervious material through which said gas mixture traverses, said gas-pervious material being in heat exchanging contact with said first group of cooling ducts, at least one other cooling duct being unconnected to said gas-pervious material, a lower common space connected to the bottom of said ducts, an upper common space connected to the top of said ducts, said gas mixture being passed over said gas-pervious material whereby heat is imparted to the cooling liquid in said first group of cooling ducts causing a vapor lift effect on said cooling liquid to elevate said liquid to said upper common space and return the same by gravity through said other cooling duct to said lower common space, and the cooling liquid in said first group of ducts maintaining the temperature of said gas-pervious material lower than the temperature at which said constituents to be separated out become solid whereby the constituents separate out in a solid state on said gas-pervious material.

3. A continuously operated separator for separating out constituents in a solid state from a cooled gas mixture as claimed in claim 2 further comprising a control member for supplying a quantity of cooling liquid to said ducts which is equal to the quantity evaporated in said ducts.

4. A continuously operated separator for separating out constituents in a solid state from a cooled gas mixture comprising a first group of substantially parallel cooling ducts having cooling liquid therein, at least one layer of gas-pervious material through which said gas mixture traverses, said gas-pervious material being in heat exchanging contact with said first group of cooling ducts, two other cooling ducts each located at an end of said first group of cooling ducts and being unconnected to said gas-pervious material, a lower common space connected to the bottom of said ducts, an upper common space connected to the top of said ducts, said gas mixture being passed over said gas-pervious material whereby heat is imparted to the cooling liquid in said first group of cooling ducts causing a vapor lift effect on said cooling liquid to elevate said liquid to said upper common space and return the same by gravity through said other cooling ducts to said lower common space, and the cooling liquid in said first group of ducts maintaining the temperature of said gas-pervious material lower than the temperature at which said constituents to be separated out become solid whereby the constituents separate out in a solid state on said gas-pervious material.

References Cited by the Examiner
UNITED STATES PATENTS

| | | | |
|---|---|---|---|
| 1,535,819 | 4/1925 | Emmet | 55—269 |
| 1,815,570 | 7/1931 | Jones | 55—269 |
| 2,009,352 | 7/1935 | Adams | 55—269 |
| 2,097,434 | 11/1937 | DeBaufre | 62—41 XR |
| 2,500,136 | 3/1950 | Ogorzaly | 62—15 |
| 2,521,400 | 9/1950 | Ogorzaly | 62—15 |
| 2,585,912 | 2/1952 | Buschow | 62—13 XR |
| 2,722,105 | 11/1955 | Keyes | 62—41 XR |
| 2,724,954 | 11/1955 | Maetz | 62—13 XR |
| 2,799,141 | 7/1957 | Jonkers | 62—40 |
| 3,067,560 | 12/1962 | Parker | 55—269 |
| 3,124,443 | 3/1964 | Hellingham | 62—14 |

NORMAN YUDKOFF, *Primary Examiner.*